US012753621B2

(12) United States Patent
Matsubara et al.

(10) Patent No.: US 12,753,621 B2
(45) Date of Patent: Oct. 6, 2026

(54) PARKING MANAGEMENT SYSTEM

(71) Applicant: TOYOTA JIDOSHA KABUSHIKI KAISHA, Aichi-ken (JP)

(72) Inventors: Takuji Matsubara, Aichi-ken (JP); Osamu Yumita, Aichi-ken (JP); Naoki Hasegawa, Aichi-ken (JP); Sa Kano, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 304 days.

(21) Appl. No.: 18/581,390

(22) Filed: Feb. 20, 2024

(65) Prior Publication Data

US 2024/0287826 A1 Aug. 29, 2024

(30) Foreign Application Priority Data

Feb. 28, 2023 (JP) ................................ 2023-030014

(51) Int. Cl.
*E04H 6/42* (2006.01)
*B60L 53/60* (2019.01)
*E04H 6/34* (2006.01)

(52) U.S. Cl.
CPC .............. *E04H 6/424* (2013.01); *B60L 53/60* (2019.02); *E04H 6/34* (2013.01)

(58) Field of Classification Search
CPC .. E04H 6/34; E04H 6/42; E04H 6/424; B60L 53/60
USPC .......................................................... 414/231
See application file for complete search history.

(56) References Cited

U.S. PATENT DOCUMENTS

| | | | | |
|---|---|---|---|---|
| 2021/0380011 | A1 | 12/2021 | Tachimoto | |
| 2024/0372367 | A1* | 11/2024 | Endo | H02J 3/322 |
| 2025/0183669 | A1* | 6/2025 | Vu | B60L 53/22 |

FOREIGN PATENT DOCUMENTS

| | | | | |
|---|---|---|---|---|
| JP | 2013-042634 | A | 2/2013 | |
| JP | 2013-188028 | A | 9/2013 | |
| JP | 2014027720 | A * | 2/2014 | |
| JP | 2020-010442 | A | 1/2020 | |
| WO | WO-2012144079 | A1 * | 10/2012 | H02J 4/25 |
| WO | 2018/167796 | A1 | 9/2018 | |
| WO | WO-2022198673 | A1 * | 9/2022 | H02J 7/42 |

OTHER PUBLICATIONS

English Translation (Year: 2014).*

* cited by examiner

*Primary Examiner* — Terrell H Matthews
(74) *Attorney, Agent, or Firm* — HAUPTMAN HAM, LLP

(57) ABSTRACT

A parking management system equipped with a plurality of pallets that can be moved in a parking space with a vehicle mounted on them, a plurality of charging and discharging devices that are installed in chargeable and dischargeable parking spaces and capable of supplying power to a predetermined facility, a controller that is programmed to control the movement of the pallets and control the charging and discharging devices. The controller is programmed to move a pallet (a feedable pallet) carrying the electric vehicle capable of supplying power to the predetermined facility to the chargeable and dischargeable parking space.

7 Claims, 4 Drawing Sheets

PARKING MANAGEMENT SYSTEM

CROSS-REFERENCE TO RELATED APPLICATION

The present disclosure claims priority to Japanese Patent Application No. 2023-030014 filed on Feb. 28, 2023, which is incorporated herein by reference in its entirety including specification, drawings and claims.

TECHNICAL FIELD

The present disclosure relates to a parking management system, more particularly, to a parking management system that manages the movement of a plurality of movable pallets carrying vehicles into parking spaces.

BACKGROUND

A parking management system of this type has been proposed, which is equipped with a stationary storage battery installed in a parking lot and a plurality of charging and discharging stands for charging and discharging a battery mounted on an electric vehicle (see, for example, Patent Document 1). In this system, power is supplied to the first load from at least one of the stationary storage batteries and the multiple charging and discharging stands, even when the power system is in an emergency. As a result, even when the power system is in an emergency, the prescribed power can be supplied to the first load.

CITATION LIST

Patent Literature

PTL 1: JP2020-010442

SUMMARY

In the parking lot where power from the battery installed in the electric vehicle can be supplied to predetermined facilities (for example, airports or shopping malls), it is difficult to install the chargeable and dischargeable parking space in all parking spaces with the chargeable and dischargeable device for the battery installed in the electric vehicle. In addition, electric vehicles parked in parking spaces where the charging and discharging devices are not installed cannot supply power to the predetermined facility. Therefore, it is an important issue for electric vehicles that are chargeable and dischargeable to a predetermined facility to be parked in parking spaces where the charging and discharging device is installed.

The main objective of the parking management system of the present disclosure is to allow more electric vehicles that are chargeable and dischargeable to the predetermined facility to park in the parking space where the charging and discharging device is installed.

The parking management system of the present disclosure has adopted the following measures to achieve the main objectives described above.

The parking management system of the present disclosure equipped with a plurality of pallets that can be moved in a parking space with a vehicle mounted on them, a plurality of charging and discharging devices that are installed in chargeable and dischargeable parking spaces and capable of supplying power to a predetermined facility, a controller that controls the movement of the pallets and controls the charging and discharging devices;

the controller is programmed to move a pallet (a feedable pallet) carrying the electric vehicle capable of supplying power to the predetermined facility to the chargeable and dischargeable parking space.

The parking management system of the present disclosure equipped with a plurality of pallets that can be moved in a parking space with a vehicle mounted on them, a plurality of charging and discharging devices that are installed in chargeable and dischargeable parking spaces and capable of supplying power to a predetermined facility, a controller that controls the movement of the pallets and controls the charging and discharging devices. the controller is programmed to move a pallet (a feedable pallet) carrying the electric vehicle capable of supplying power to the predetermined to the facility chargeable and dischargeable parking space. By moving the feedable pallet to the chargeable and dischargeable parking space, the electric vehicle that can feed the predetermined facility can be parked in the chargeable and dischargeable parking space. As a result, it is possible to have more electric vehicles that can feed the predetermined facility parked in the parking space where the charging and dischargeable device is installed.

In the parking management system of the present disclosure, the chargeable and dischargeable parking space may have a first parking space with a short feed line to the predetermined facility and a second parking space with a longer feed line to the predetermined facility compared to the first parking space, the controller may be programmed to preferentially move the feedable pallet to the first parking space. By moving more feedable pallets to the first parking space with shorter feed lines, it is possible to reduce the power loss when feeding power to the predetermined facility. In the parking management system in this case, the chargeable and dischargeable parking space may be located in a part of a multi-story multi-level parking space or in a portion of a flat parking space arranged in a flat area.

In the parking management system of the present disclosure, the parking management system may be equipped with a plurality of charging devices installed in a chargeable parking space that can only be used for charging, the controller may be programmed to move the feedable pallet to the chargeable and dischargeable parking space when the feedable pallet is in a general parking space where neither charging nor feeding is allowed or in the chargeable parking space. This way, it is possible to have more electric vehicles that can feed the predetermined facility parked in the parking space where the charging and dischargeable devices are installed. In the parking management system in this case, the chargeable and dischargeable parking space may be located at a short distance to the predetermined facility. In this way, it is possible to reduce the power loss when feeding power to the predetermined facility.

In the parking management system of the present disclosure, the controller may be programmed to preferentially move a pallet carrying electric vehicles whose on-board batteries are in a condition to feed power to the predetermined facility (conditioned pallet) to the chargeable and dischargeable parking space. In this way, the predetermined facility can be fed more efficiently than if the pallets that do not meet the feedable conditions are moved to the chargeable and dischargeable parking space. The feeding condition can be a condition in which the capacity of the on-board power storage device is above a predetermined value or the remaining capacity of the storage device is above a predetermined value.

DESCRIPTION OF EMBODIMENTS

Figure 1:
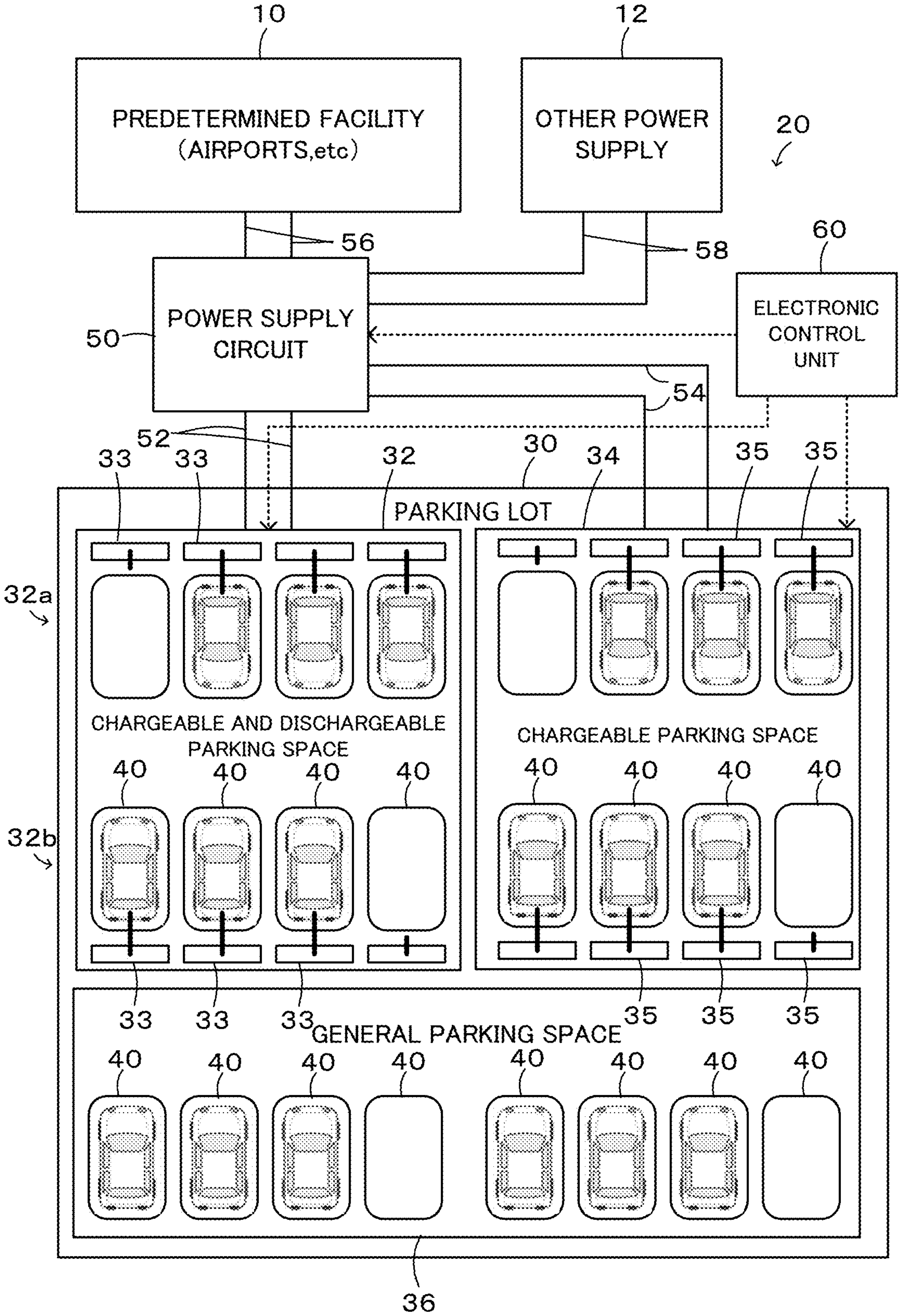
FIG. 1 shows the schematic configuration of the parking management system 20 as an embodiment of this disclosure.

The embodiment of this disclosure is described next. FIG. 1 shows the schematic configuration of the parking management system 20 as an embodiment of this disclosure. The parking management system 20 of the embodiment, as shown in the figure, is equipped with a plurality of pallets 40 placed in each parking space of parking lot 30 and movable with a vehicle mounted thereon, a plurality of the charging and discharging devices 33 installed in the chargeable and dischargeable parking spaces 32 of the parking lot 30, a plurality of the charging devices 35 installed in the chargeable parking spaces 34 of the parking lot 30, the power supply circuit 50, and the electronic control unit 60.

The parking lot 30 has a chargeable and dischargeable parking space 32, a chargeable and dischargeable parking space 34, and a general parking space 36. The chargeable and dischargeable parking spaces 32 are located in the area of the parking lot 30 that is closest to the predetermined facility 10, and each parking space is equipped with a charging and discharging device for charging and discharging the battery mounted on the vehicle. The reason that the chargeable and dischargeable parking spaces 32 are located in the area of the parking lot 30 that is closest to the predetermined facility 10 is to reduce the power loss (loss) when supplying the predetermined facility 10 with power from the batteries installed in the electric vehicles parked in each of the chargeable and dischargeable parking spaces 32. The chargeable and dischargeable parking spaces 32 are divided into the first parking space 32*a* (the upper parking space in FIG. 1), which is closer to the predetermined facility 10, and the second parking space 32*b* (the lower parking space in FIG. 1), which is farther from the predetermined facility 10. The predetermined facility 10 will be described assuming an airport as an embodiment, but it can also be a large leisure facility with hotels, etc., a shopping center, a railroad station, a port, and so on.

The chargeable and dischargeable parking spaces 34 are located in an area of parking lot 30 that is farther from the predetermined facility 10 than the chargeable and dischargeable parking spaces 32, and each parking space has a charging device 35 that can only charge the battery installed in the vehicle. The general parking spaces 36 are located in the area of the parking lot 30 farthest from the predetermined facility 10, and each parking space is not equipped with a charging and discharging device 33 or a charging device 35.

Each of the pallets 40 in the parking lot 30 is provided with a moving mechanism (not shown) such that it can be moved to each parking space with the vehicle on it, and the movement is controlled by the electronic control unit 60.

The power supply circuit 50 is located between the chargeable and dischargeable parking spaces 32 in the parking lot 30 and the predetermined facility 10. The power supply circuit 50 is connected to each of the charging and discharging devices 33 in the chargeable and dischargeable parking space 32 by the power line 52 and to each of the charging devices 35 in the chargeable parking space 34 by the power line 54. Also, the power supply circuit 50 is connected to the electrical facility (not shown) of the predetermined facility 10 by power line 56 and to the other power supply 12 by the power line 58. The other power supply 12 is configured to include at least some of various power sources, such as the commercial power supply, the solar power supply, the wind power supply, the tidal power supply, and the geothermal power supply, for example. The power supply circuit 50 is configured as a circuit that adjusts the voltage of power supplied from the other power supply 12 and supplies it to the predetermined facility 10, the charging and discharging device 33, and the charging device 35, or adjusts the voltage of power from the battery installed in the electric vehicle via the charging and discharging device 33 and supplies it to the predetermined facility 10.

The electronic control unit 60, not shown, is configured as a microcomputer with a CPU at its core. The electronic control unit 60 inputs the voltage Vin from the voltage sensor (not shown) and the current Iin from the current sensor (not shown) attached to the other power supply 12, the voltage Vcd from the voltage sensor (not shown) and the current Icd from the current sensor (not shown) attached to the power line 52 connected to each of the charging and discharging device 33 in the chargeable and dischargeable parking space 32, the voltage Vch from the voltage sensor (not shown) and the current Ich from the current sensor (not shown) attached to the power line 54 connected to each of the charging devices 35 in the chargeable parking space 34, the voltage Vout from the voltage sensor (not shown) and the current Iout from the current sensor (not shown) attached to the electrical facility of the predetermined facility 10. The electronic control unit 60 outputs the drive control signals to the moving mechanism for moving each of the pallets 40, the control signals to each of the charging and discharging device 33 in the chargeable and dischargeable parking space 32, the control signals to each of the charging devices 35 in the chargeable parking space 34. The electronic control unit 60 provides the drive control signals to each relay (not shown) installed on each of the power lines 52, 54, 56, 58 within the power supply circuit 50, the drive control signals to each of the provided power converters (not shown) attached to each of the power lines 52, 54, 56, 58 within the power supply circuit 50.

Figure 2:
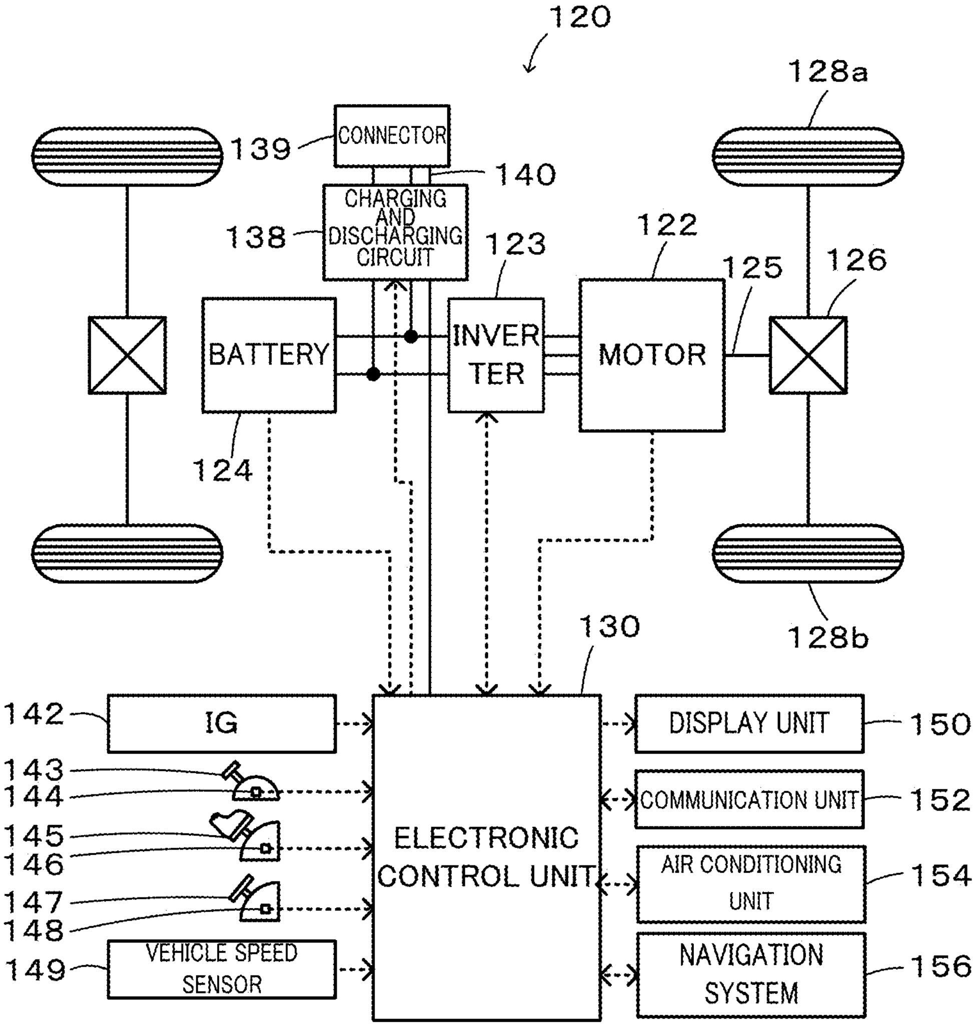
FIG. 2 shows the schematic configuration of the vehicle configurations that can use the chargeable and dischargeable parking spaces 32 in the parking lot 30.

The vehicle that can use the chargeable and dischargeable parking space 32 in the parking lot 30 can be, for example, the electric vehicle 120 illustrated in FIG. 2. The electric vehicle 120 is equipped with the motor 122, the inverter 123, the battery 124, the charging and discharging circuit 138, the connector 139, and the electronic control unit 130.

The motor 122 is configured, for example, as the synchronous generator motor. The rotor of the motor 122 is connected to the drive shaft 125 connected to the drive wheels 128*a*, 128*b* via the differential gear 126. The motor 122 is driven by three-phase AC power applied by the inverter 123 after DC power from the battery 124 is converted to three-phase AC power by the inverter 123. The battery 124 is configured as a well-known lithium-ion rechargeable battery or nickel-metal hydride rechargeable battery.

The charging and discharging circuit 138 is connected at one end to a power line connected to the battery 124 and at the other end to the connector 139 for connection to the charging and discharging device 33 or the charging device 35. The charging and discharging circuit 138 has the charging and discharging relay, which is not shown in the figure. The charging and discharging circuit 138 is connected to and disconnected from the battery 124 by the charging and discharging relay.

The electronic control unit 130 is configured as a micro-computer, which is mainly composed of a CPU, not shown in the figure. The electronic control unit 130 receives signals from various sensors via input ports. For example, the electronic control unit 130 inputs the ignition signal from the ignition switch 142, the shift position SP from the shift position sensor 144 that detects the position of the shift lever 143, the acceleration Acc from the accelerator pedal position sensor 146 that detects the amount of depressing the accelerator pedal 145, he brake position BP from the brake pedal position sensor 148 that detects the amount of depressing the brake pedal 147, and the vehicle speed V from the speed sensor 149. The electronic control unit 130 also inputs the rotation position θ from the rotation position sensor (not shown) that detects the rotation position of the motor 122, the battery voltage Vb from the voltage sensor (not shown) attached to the output terminal of the battery 124, the battery current Ib from the current sensor (not shown) attached to the output terminal of the battery 124, the charging and discharging voltage Vchg from the voltage sensor attached to the charging and discharging circuit 138, and the charging and discharging current Ichg from the current sensor attached to the charging and discharging circuit 138.

The electronic control unit 130 outputs various control signals via output ports. For example, the electronic control unit 130 outputs the display control signals to the display unit 150, the communication control signals to the communication unit 152, and the air conditioning control signals to the air conditioning unit 154. The electronic control unit 130 also outputs the switching control signals for switching the switching elements (not shown) to the inverter 123 to drive the motor 122, the drive control signals to the system main relay (not shown) mounted near the battery 124, and the drive control signal to the charging and discharging relay (not shown) attached to the charging and discharging circuit 138. The electronic control unit 130 communicates with the navigation system 156, which displays various information and provides route guidance. The electronic control unit 130 has the signal line 140 connected to it to communicate with the charging and discharging device 38 when the charging and discharging device 38 is connected via the connector 139.

Figure 3:
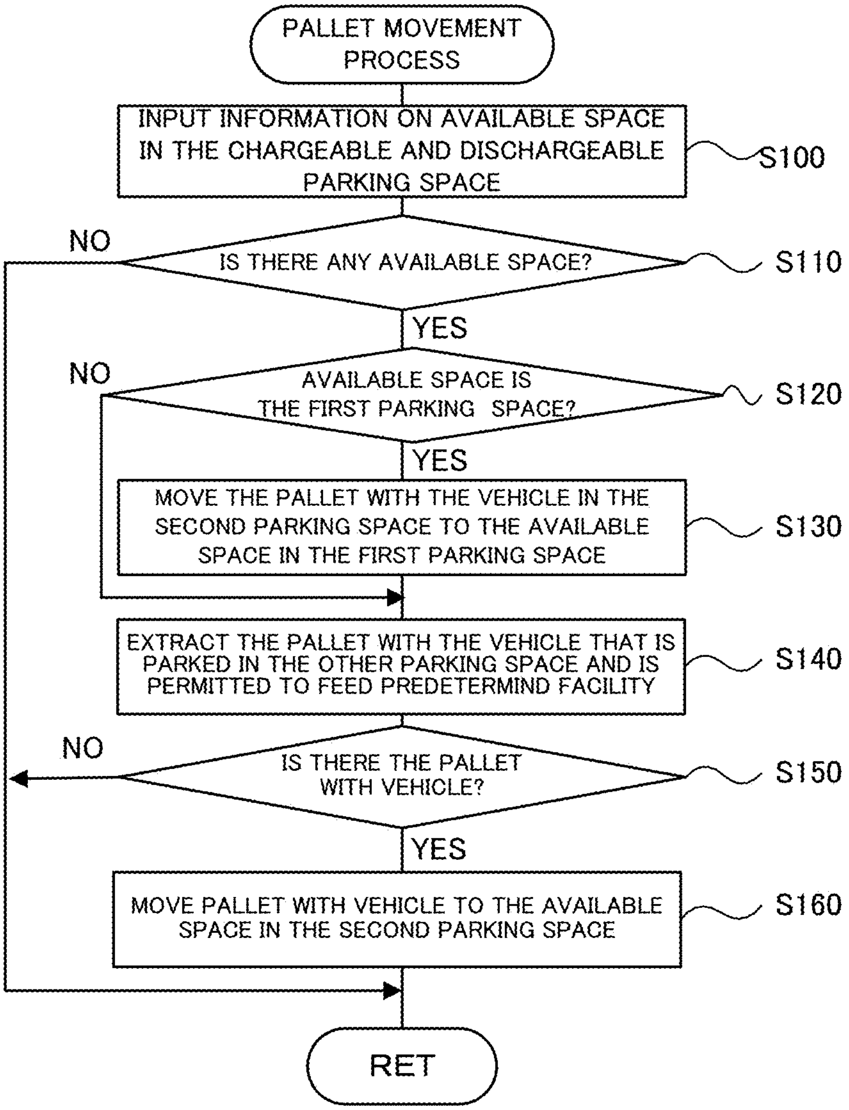
FIG. 3 shows the flowchart of an example of a pallet movement process executed by the electronic control unit 60.

Next, the operation of the parking management system 20 of the embodiment thus configured will be described, particularly in the movement of pallets 40. FIG. 3 shows the flowchart of an example of a pallet movement process executed by the electronic control unit 60. The pallet moving process is repeated every predetermined time.

When the pallet movement process is executed, the electronic control unit 60 first inputs information on available spaces in the chargeable and dischargeable parking spaces 32 in the parking lot 30 (step S100) and determines whether or not there spaces in the chargeable and dischargeable parking spaces 32 (step S110). In the embodiment, the electronic control unit 60 inputs vehicle information such as the scheduled entry date and time, the scheduled exit date and time, the type of vehicle, whether the vehicle is electric vehicle or not, whether the vehicle is allowed to feed power to the predetermined facility 10, and whether the vehicle is charged when parking in each parking space or when making a parking reservation and assigns a parking space for the vehicle. The electronic control unit 60 stores the vehicle information and the space information of the assigned parking space as parking information. The electronic control unit 60 retrieves information on available spaces in the chargeable and dischargeable parking spaces 32 in the parking lot 30 by searching the parking information for available spaces in the chargeable and dischargeable parking spaces 32 at the current time. For vehicles that are electric vehicles and are permitted to feed the predetermined facility 10, priority is given to the chargeable and dischargeable parking spaces 32, the chargeable parking spaces 34, and the general parking spaces 36, in that order. For vehicles that are electric vehicles but are not permitted to feed the predetermined facility 10, priority is given to the chargeable parking spaces 34, and then to the general parking spaces 36. For vehicles that are not electric vehicles, the general parking spaces 36 are assigned. When the electronic control unit 60 determines in step S110 that there are no spaces available in the chargeable and dischargeable parking space 32, it terminates this process without moving the pallet 40.

The electronic control unit 60 determines that there is an available space in the chargeable and dischargeable parking space 32 in step S110, and then determines whether the available space is the first parking space 32*a* (step S120). The electronic control unit 60 determines that the available space in the chargeable and dischargeable parking space 32 is the first parking space 32*a*, it moves the pallet 40 with the vehicle in the second parking space 32*b* of the chargeable and dischargeable parking space 32 to the available space in the first parking space 32*a* (step S130). The reason for moving the pallet 40 with the vehicle in the second parking space 32*b* to the available space in the first parking space 32*a* is to park more electric vehicles in the first parking space 32*a* closer to the predetermined facility 10 and to reduce the power loss (loss) when supplying the power from the battery in the electric vehicle to the predetermined facility 10. Note that such movement of the pallet 40 will create available space in the second parking space 32*b*.

When the electronic control unit 60 determines in step S120 that the available space in the chargeable and dischargeable parking space 32 is not the first parking space 32*a*, and has moved in step S130 the pallet 40 carrying the vehicle in the second parking space 32*b* to an available space in the first parking space 32*a*, the electronic control unit 60 extracts the pallet 40 with the vehicle that is parked in the other parking space and is permitted to feed the predetermined facility 10 from the pallet 40 with the vehicle (Step S140). This process can be performed by searching for pallets carrying vehicles that have been assigned the chargeable parking space 34 or the general parking space 36 in the parked vehicle information and that are permitted to feed the predetermined facility 10.

The electronic control unit 60 determines whether or not there is the pallet 40 with the vehicle that is parked in another parking space that is permitted to feed power to the predetermined facility 10 (step S150). When the electronic control unit 60 determines that there is a pallet 40 with the corresponding vehicle on it, it moves the pallet 40 to an available space in the second parking space 32*b* of the chargeable and dischargeable parking space 32 (step S160) and ends this process. The reason for moving the corresponding pallet 40 to the available space in the second parking space 32*b* of the chargeable and dischargeable parking space 32 is to allow more electric vehicles to park in the chargeable and dischargeable parking space 32 and to supply power from the batteries on more electric vehicles to the predetermined facility 10. On the other hand, when the electronic control unit 60 determines that there is no pallet 40 that carries the corresponding vehicle, it terminates this process without moving the pallet 40.

In the parking management system 20 of the embodiment described above, when an available space in the first parking space 32*a* of the chargeable and dischargeable parking space 32 becomes available, the pallet 40 with the vehicle in the second parking space 32*b* of the chargeable and dischargeable parking space 32 is moved to the available space in the first parking space 32*a*. This allows more electric vehicles to be parked in the first parking space 32*a* closer to the predetermined facility 10, thereby reducing the power loss (loss) when supplying power from the battery mounted on the electric vehicle to the predetermined facility 10.

In the parking management system 20 of the embodiment, when an available space becomes available in the second parking space 32*b* of the chargeable and dischargeable parking space 32, the pallet 40 of the other parking spaces with vehicles that are permitted to feed the predetermined facility 10 is moved to the second parking space 32*b*. This allows more electric vehicles to be parked in the chargeable and dischargeable parking space 32 and more power from the batteries in the electric vehicles to be supplied to the predetermined facility 10.

In the parking management system 20 of the embodiment, the chargeable and dischargeable parking space 32 is divided into a first parking space 32*a* and a second parking space 32*b*, but such a division may not be made. In this case, the pallet movement process should move the pallet 40 of the other parking spaces with the vehicle that is permitted to feed the predetermined facility 10 to the chargeable and dischargeable parking space 32 when an available space in the chargeable and dischargeable parking space 32 becomes available.

In the parking management system 20 of the embodiment, when an available space is created in the second parking space 32*b* of the chargeable and dischargeable parking space 32, the pallet 40 of the other parking space with the vehicle that is permitted to feed the predetermined facility 10 shall be moved to the second parking space 32*b*. However, when an available space in the chargeable and dischargeable parking space 32 becomes available, the pallet 40 of the pallets in the chargeable parking space 34 with vehicles that are permitted to feed the predetermined facility 10 may be moved to the chargeable and dischargeable parking space 32 or the pallet 40 of the pallets in the chargeable parking space 34 with the vehicle that has other feedable conditions in addition to the conditions that allow it to feed the predetermined facility 10 may be moved to the chargeable and dischargeable parking space 32. Other power supply conditions include, for example, the condition that the capacity of the battery is above a predetermined value or the remaining capacity of the battery is above a predetermined value.

Figure 4:
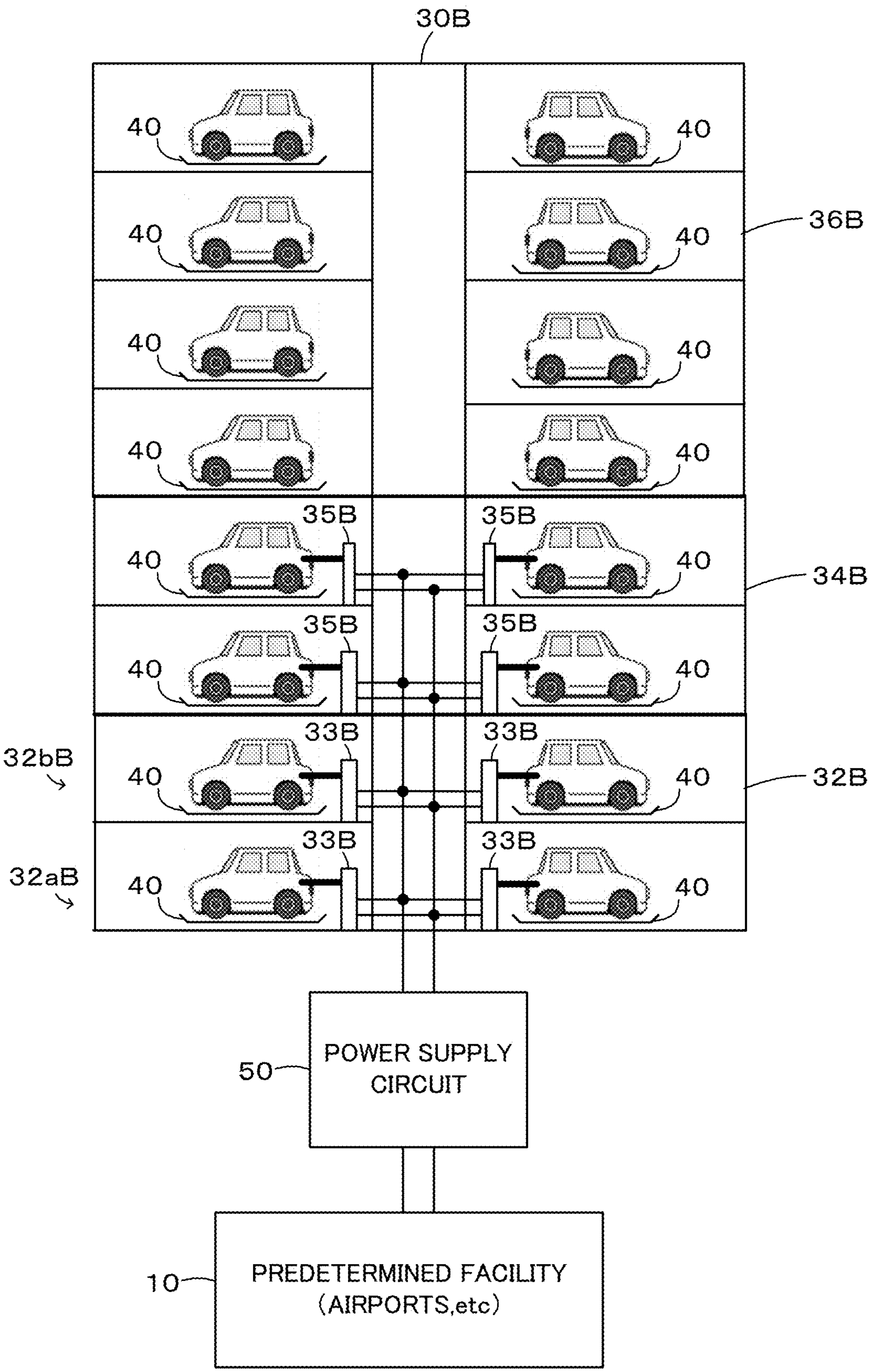
FIG. 4 shows the schematic configuration of the parking lot 30B in the modified configuration.

In the parking management system 20 of the embodiment, the chargeable and dischargeable parking space 32 with charging and discharging device 33 is placed in the area closest to the predetermined facility 10 among the parking lot 30 in plain view, the chargeable and dischargeable parking space 34 with the charging device 35 is placed in the area of the parking lot 30 that is next closest to the predetermined facility 10 after the chargeable and dischargeable parking space 32, the general parking space 36 is located in the area of parking lot 30 that is far from the predetermined facility 10. However, as shown in the modified example in FIG. 4, the chargeable and dischargeable parking space 32B with the charging and discharging device 33B may be placed at the lowest level of the multi-level parking lot 30B that is closest to the predetermined facility 10, the chargeable and dischargeable parking space 34B with the charging device 35B may be placed at the middle level of the multi-level parking lot 30B that is next to the chargeable and dischargeable parking space 32B and closer to the predetermined facility 10, the general parking space 36B may be placed at a higher level of the multilevel parking lot 30B that is farther from the predetermined facility 10. Furthermore, the first parking space 32*a*B may be placed on the lower level of the chargeable and dischargeable parking space 32B in the multi-level parking lot 30B, and the second parking space 32*b*B may be placed on the upper level.

The parking reservation management device 20 in the embodiment assumes an electric vehicle 120 that runs by driving the motor 122 using power from the battery 124 to drive the motor 122 as a vehicle that can use the chargeable and dischargeable parking space 32 in the parking lot 30. However, any vehicle that is equipped with a chargeable and dischargeable battery is acceptable. For example, the vehicle may be a hybrid vehicle with an engine, motor, and battery, or a fuel cell vehicle with a fuel cell and battery, or various other configurations.

The following is an explanation of the correspondence between the main elements of the embodiment and the main elements of the disclosure described in the section on means to solve the problem. In the embodiment, the pallet 40 corresponds to "pallet", the chargeable and dischargeable parking space 32 corresponds to "the chargeable and dischargeable parking space", the charging and discharging device 33 corresponds to "the charging and discharging device", and the electronic control unit 60 corresponds to "the controller".

The correspondence between the major elements of the embodiment and the major elements of the disclosure described in the means to solve a problem section is an example of how the embodiment can be used to specifically explain the embodiment of the disclosure described in the means to solve a problem section. This does not limit the elements of the disclosure described in the means to solve the problem section. In other words, interpretation of the disclosure described in the means to solve a problem section should be based on the description in that section, and the embodiment is only one specific example of the disclosure described in the means to solve a problem section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the manufacturing industry for the parking management system and other applications.

What is claimed is:

1. A parking management system equipped with a plurality of pallets that can be moved in a parking space with a vehicle mounted on them, a plurality of charging and discharging devices that are installed in chargeable and dischargeable parking spaces and capable of supplying power to a predetermined facility, a plurality of charging devices installed in chargeable parking spaces that can only be used for charging, and a controller that is programmed to control the movement of the pallets and control the charging and discharging devices;

the controller is programmed, upon parking, to input in advance whether supply of power to the predetermined facility is permitted, and to preferentially assign a pallet carrying an electric vehicle permitted to supply power to the predetermined facility in the following order: a chargeable and dischargeable parking space, a chargeable parking space, and a general parking space where neither charging nor feeding is allowed, and to preferentially assign a pallet carrying an electric vehicle not permitted to supply power to the predetermined facility in the following order: a chargeable parking space and a general parking space.

2. The parking management system according to claim 1, wherein a chargeable and dischargeable parking space of the chargeable and dischargeable parking spaces has a first parking space with a short feed line to the predetermined facility and a second parking space with a longer feed line to the predetermined facility compared to the first parking space, the controller is programmed to preferentially move the feedable pallet to the first parking space.

3. The parking management system according to claim 2, wherein the chargeable and dischargeable parking spaces are located in a part of a multi-story multi-level parking space or in a portion of a flat parking space arranged in a flat area.

4. The parking management system according to claim 1, wherein the controller is programmed to preferentially move a pallet carrying electric vehicles whose on-board batteries are in a condition to feed power to the predetermined facility to a chargeable and dischargeable parking space.

5. The parking management system according to claim 1, wherein the controller is programmed to move a pallet of the plurality of pallets carrying a vehicle from a parking space of the chargeable and dischargeable parking spaces that is farther from the predetermined facility to a parking space of the chargeable and dischargeable parking spaces that is closer to the predetermined facility when an available space in the closer parking space becomes available.

6. The parking management system according to claim 1, wherein the controller is programmed to preferentially move a pallet of the plurality of pallets carrying an electric vehicle whose on-board battery has a remaining capacity above a predetermined value to a chargeable and dischargeable parking space.

7. The parking management system according to claim 1, wherein the controller is programmed to input vehicle information including a scheduled entry date and time and a scheduled exit date and time when making a parking reservation, and to assign a parking space for a vehicle based on the vehicle information.

* * * * *